Figure 1:
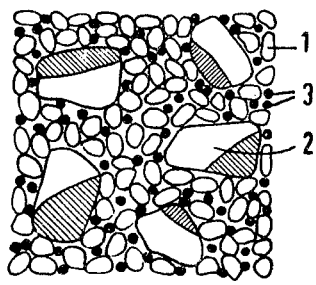

3,328,165
PROCESS FOR THE PRODUCING OF GAS DIFFUSION ELECTRODES AND ELECTRODES MADE THEREBY
Ludwig Schwank, Nurnberg, Germany, assignor to Siemens-Schuckertwerke Aktiengesellschaft, Berlin-Siemensstadt, Germany, a German corporation
Filed Mar. 10, 1965, Ser. No. 438,618
Claims priority, application Germany, Mar. 19, 1964, S 90,103
8 Claims. (Cl. 75—206)

My invention relates to gas diffusion electrodes. More particularly, it relates to a process for the making of firm gas diffusion electrodes having improved coherence of constituents and gas diffusion electrodes made by such process.

Many of the electrode types which are presently used in electro-chemical devices such as in nickel-cadmium storage cells, electrolyzing arrangements, fuel cells and the like are made by a process in which an important step is the compressing and/or sintering of powder materials. Where only the compressing step is a part of the process, such compressing is generally accomplished by so-called "hot pressing," i.e., pressing a powder mixture at elevated temperatures. Such hot pressing, however, results in crumbly, friable structures which do not retain their integrity of form and bulk and as such their use presents many problems such as poor operation, short life, expense of frequent replacement, etc.

Wherein the process includes both compressing and sintering, compression is first carried out and then the compressed material is sintered. Such combination of steps of compressing followed by sintering results in structures which are improved in coherence and less friable than those made by hot pressing alone. However, where it is desired to make a gas diffusion electrode such as the type utilized in fuel cells wherein usually powdered nickel and powdered Raney nickel aluminum alloy is first compressed and then sintered, the making of this electrode further requires the treatment of the resulting sintered structure with a strong caustic alkali such as potassium hydroxide. The sintering at high temperature effects, through diffusion of the two Raney phases of the Raney alloy, viz., $Al_3Ni_2$ and $Al_3Ni$, a metallographically demonstrable phase and the treatment of the sintered body with the aforesaid potassium hydroxide develops the active centers of the gas diffusion electrode by dissolving out the aluminum and other activating action. It has been found that the beneficial effects with respect to continuing coherence of the sintered body provided through the high temperature sintering thereof are in a very large part lost in the ensuing potassium hydroxide activation treatment and the resulting electrode is disadvantageously crumbly and friable.

Accordingly, it is an important object of this invention to provide a process for making a molded body from powdered metal which retains its integrity and coherence after an activation treatment.

It is another object to provide a process for making a gas diffusion electrode having improved coherence characteristics.

It is a further object to provide a gas diffusion electrode produced by the process set forth in the preceding object.

To attain such objects, there is provided according to the invention a process for the production of a coherent porous molded body which includes the steps of mixing metal powder with the oxide powder of the same metal, molding the mixture under pressure into a chosen structure, and heating the resulting structure at a temperature, which is low as compared to the normal sintering temperature of the metal powder, in a reducing atmosphere such as hydrogen whereby the metal oxide is reduced to the metal and whereby the metal resulting from the reduction of the metal oxide coalesces with the metal powder. Through the coalescence of the metal produced from the metal oxide phase of the mixture with the metal powder a high and long lasting coherence in the molded structure is achieved. Since the reduction of the metal oxide is effected at a temperature which is low in relation to the sintering temperature of the metal powder, a diffusion of the various metal phases in the mixture into one another takes place.

In the making of a gas diffusion electrode in accordance with the invention, the metal powder utilized comprises a mixture of Raney nickel alloy such as Raney nickel aluminum alloy and a nickel powder which suitably comprises carbonyl nickel. The oxide utilized is nickel oxide. The normal sintering temperature for a Raney nickel aluminum alloy powder, carbonyl nickel powder mixture may be between 600 to 1000° C. In accordance with the invention, the heating temperature may be as low as 200–300° C.

Generally speaking and in accordance with the invention there is provided a process for providing a coherent body of a chosen structure which includes the step of compressing a mixture of a quantity of a given sinterable metal with a lesser quantity of the oxide powder of such metal into said structure, and heating the resulting structure in a reducing atmosphere at a temperature substantially less than the temperature normally required for sintering the metal powder.

In accordance with an illustrative embodiment of the invention, there is provided a method for making a gas diffusion electrode of a chosen structure which comprises the steps of mixing a quantity of mixture of Raney nickel alloy with nickel powder, with a quantity of nickel oxide, compressing the resulting mixture into the chosen structure, and heating the resulting structure in a predried hydrogen atmosphere at a temperature substantially less than the normal sintering temperature of nickel powder whereby the nickel produced from the nickel oxide coalesces with the nickel metal powder into a porous coherent molded body having the aforesaid structure. The molded structure, after it is cooled, is activated with caustic potash solution to produce a gas diffusion electrode, advantageously utilized in a fuel cell.

Figure 2:
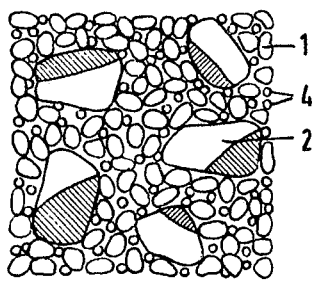
Figure 3:
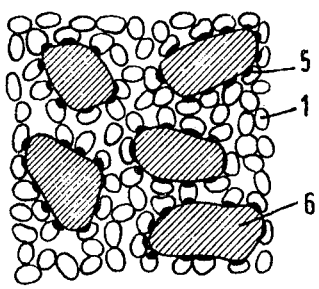

The foregoing and more specific objects and features of my invention will be apparent from, and will be mentioned in the following description of the process for making a gas diffusion electrode according to the invention shown by way of example in the accompanying drawing in which FIG. 1 shows a powder mixture resulting from the mixing of a mixture of Raney nickel alloy with nickel, and nickel oxide, FIG. 2 shows the mixture of FIG. 1 after it has been subjected to a compressing and heating in a hydrogen, i.e., reducing atmosphere, and FIG. 3 shows a structure resulting from the conventional sintering of a powder mixture of Raney nickel aluminum alloy powder and nickel powder.

The following example is an embodiment of the process of the invention.

A mixture is made of Raney nickel aluminum alloy powder having a granular size of about 30$\mu$, nickel powder, preferably carbonyl nickel, having a granular size of about 6$\mu$, and nickel oxide powder having a granular size of about 4$\mu$. In the mixture, the proportions by weight of the various constituents in the mixture are suitably 1 part Raney nickel aluminum alloy powder, 0.8 part carbonyl nickel powder and 0.2 part nickel oxide powder. The mixture is molded under a pressure of about $4t/cm.^2$ into the desired electrode structure. The resulting structure is then heated at a temperature of about 300° C. in a predried hydrogen atmosphere in a protective gas furnace. As a result of such heating, the metal reduced by the hydrogen in the metal oxide phase of the compressed mixture coalesces with the nickel in the nickel powder phase to form a porous strongly coherent molded body. The structure is cooled and thereafter treated with caustic potash solution to dissolve out the aluminum and activate the structure. The activated structure retains its advantageous coherence properties and is advantageously utilized as a gas diffusion electrode in a fuel cell.

The effects of the above described process can be understood by examining the figures. In this connection, FIG. 1 shows the mixture of Raney nickel aluminum alloy powder, carbonyl nickel powder, and nickel oxide powder mixed and thereafter compressed in accordance with the inventive process. In these figures, the nickel granules are designated by the numeral 1, the Raney nickel aluminum alloy granules are designated by the numeral 2, and the nickel oxide granules are designated by the numeral 3. As is seen in FIG. 1, the different particles are discrete and not diffused into one another.

In FIG. 2, which shows the compressed mixture of FIG. 1 after its heating in a predried hydrogen atmosphere at 300° C., it is seen that nickel 4 is produced from the reduction of the nickel oxide phase to coalesce with the other nickel, i.e., from the nickel powder in the mixture.

In FIG. 3, which shows the result of the normal sintering of Raney nickel aluminum alloy powder and carbonyl nickel powder only, the aluminum has diffused into the carbonyl nickel because of the action resulting from high sintering temperatures whereby a diffusion layer 5 has formed. Within the diffusion layer the Raney alloy phases, viz., $Al_3Ni_2$ and $Al_3Ni$ have combined into a mixture 6.

It is thus seen from the figures that, where a gas diffusion electrode is made according to the process of this invention, there is produced a coalescence of nickel from the nickel oxide powder with the nickel from the nickel powder to provide coherent qualities to the electrode structure. No such coalescence occurs in a structure resulting from sintering.

It will be obvious to those skilled in the art upon studying this disclosure that processes for producing a gas diffusion electrode according to my invention permit of a great variety of modifications and hence can be given embodiments other than those particularly illustrated and described herein without departing from the essential features of my invention and within the scope of the claims annexed hereto.

I claim:
1. A process for producing a gas diffusion electrode of a chosen structure comprising compressing a mixture resulting from the mixing of a mixture of Raney nickel alloy powder and nickel powder with nickel oxide powder into said structure, and thereafter heating said compressed structure in a relatively inert reducing atmosphere at a temperature between 200° and 300° C. for a period sufficient to produce nickel from said nickel oxide and to cause said last named nickel to coalesce with said nickel powder without sintering.

2. A process for producing a gas diffusion electrode of a chosen structure comprising compressing a mixture resulting from the mixing of a mixture of Raney nickel alloy powder and carbonyl nickel powder with nickel oxide powder into said structure, heating said compressed structure in a predried hydrogen atmosphere at a temperature between 200° and 300° C. for a period sufficient to produce nickel from said nickel oxide and to cause said last named nickel to coalesce with said nickel powder without sintering, and thereafter subjecting the structure resulting from said heating to activation by caustic alkali.

3. A process for producing a gas diffusion electrode of a chosen structure comprising compressing a mixture resulting from the mixing of a mixture of Raney nickel alloy powder and nickel powder, and nickel oxide powder wherein the quantity of said nickel oxide powder is at least 10% by weight of the quantity of said nickel powder, into said structure, heating said compressed structure in a predried hydrogen atmosphere at a temperature between 200° and 300° C. for a period sufficient to produce nickel from said nickel oxide and to cause said last named nickel to coalesce with said nickel powder without sintering, and thereafter subjecting the structure resulting from said heating to activation by caustic potash.

4. A process for producing a gas diffusion electrode of a chosen structure comprising compressing a mixture resulting from the mixing of a mixture of Raney nickel alloy powder and carbonyl nickel powder, and nickel oxide powder wherein the quantity of said nickel oxide powder is at least 10% by weight of the quantity of said carbonyl nickel powder, into said structure, heating said compressed structure in a predried hydrogen atmosphere at a temperature of between 200 and 300° C. for a period sufficient to produce nickel from said nickel oxide and to cause said last named nickel to coalesce with said nickel powder without sintering, and thereafter subjecting the structure resulting from said heating to activation by caustic potash.

5. A process as defined in claim 4 wherein there is utilized Raney nickel alloy powder comprising granules having a size of about $30\mu$, carbonyl nickel powder comprising granules having a size of about $6\mu$, and nickel oxide powder comprising granules having a size of about $4\mu$.

6. A process as defined in claim 4 wherein said Raney nickel alloy powder, carbonyl nickel powder and nickel oxide powder are utilized in respective quantities having the ratio of 1 part by weight of said alloy powder, 0.8 part by weight of said nickel powder, and 0.2 part by weight of oxide powder.

7. A process as defined in claim 6 wherein said mixture is compressed into said structure at a pressure of about $4t/cm.^2$.

8. A process for producing a gas diffusion electrode of a chosen structure comprising mixing Raney nickel alloy powder of a granular size of about $30\mu$, carbonyl nickel powder having a granular size of about $6\mu$ and nickel oxide powder having a granular size of about $4\mu$ in quantities having the proportions of 1 part, 0.8 part and 0.2 part respectively, compressing the resulting mixture into said structure under a pressure of about $4t/cm.^2$, heating the resulting structure at a temperature of about 300° C. in a predried hydrogen atmosphere for a period sufficient to produce nickel from said nickel oxide and to cause said last named nickel to coalesce with said nickel powder granules without sintering, and thereafter treating the structure with caustic potash to activate said structure.

References Cited

UNITED STATES PATENTS

| | | | |
|---|---|---|---|
| 2,672,494 | 2/1954 | Fleischer | 75—206 X |
| 3,150,011 | 9/1964 | Winsel | 75—208 X |

CARL D. QUARFORTH, *Primary Examiner.*

BENJAMIN R. PADGETT, *Examiner.*

A. J. STEINER, *Assistant Examiner.*